(12) United States Patent
Anandan et al.

(10) Patent No.: US 12,416,291 B2
(45) Date of Patent: Sep. 16, 2025

(54) CONNECTION EQUIPMENT ADAPTER FOR A WIND TURBINE TOWER SECTION

(71) Applicant: Siemens Gamesa Renewable Energy A/S, Brande (DK)

(72) Inventors: Guru Anandan, Ranipet (IN); Soeren Majdal Kaarsholm, Copenhagen N (DK); Shiva Rahul Tummala, Vijayawada (IN); Vidyasagar Venkatachalam, Tamil Nudu (IN); Witold Zareba, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 273 days.

(21) Appl. No.: 18/116,670

(22) Filed: Mar. 2, 2023

(65) Prior Publication Data
US 2023/0296079 A1 Sep. 21, 2023

(30) Foreign Application Priority Data
Mar. 17, 2022 (EP) .................................... 22162745

(51) Int. Cl.
*F03D 13/40* (2016.01)
*F03D 13/20* (2016.01)

(52) U.S. Cl.
CPC ............. *F03D 13/20* (2016.05); *F03D 13/40* (2016.05); *F05B 2260/02* (2013.01)

(58) Field of Classification Search
CPC ........ F03D 13/20; F03D 13/40; F03D 13/402; F05B 2260/02; Y02E 10/72; B66C 1/108
See application file for complete search history.

(56) References Cited

U.S. PATENT DOCUMENTS

2007/0294955 A1 12/2007 Sportel
2009/0090069 A1* 4/2009 Willis .................... E04H 12/08
                                                    52/745.19

(Continued)

FOREIGN PATENT DOCUMENTS

CN         204024187 U    12/2014
DE      102014112787 A1    3/2016
(Continued)

OTHER PUBLICATIONS

European Search Report issued on Sep. 7, 2022 for application No. 22162745.8.

*Primary Examiner* — Aaron R Eastman
(74) *Attorney, Agent, or Firm* — Schmeiser, Olsen & Watts, LLP

(57) ABSTRACT

The following describes a supporting system for supporting a tower section of a wind turbine. The supporting system includes a connection plate including a tower connection portion and a support connection portion, wherein the support connection portion is configured for being coupled to a tower support device for supporting the tower section. The tower connection portion includes a tower connection hole for being coupleable to a tower hole extending through a shell section of the tower section. The supporting system further includes a clamping device being partially insertable in the tower connection hole of the tower connection portion and the tower hole for detachably clamping the connection plate to the tower section.

15 Claims, 5 Drawing Sheets

(56) References Cited

U.S. PATENT DOCUMENTS

| | | | | |
|---|---|---|---|---|
| 2011/0194896 A1* | 8/2011 | Fenger | .................... | F03D 13/40 |
| | | | | 403/373 |
| 2015/0308134 A1* | 10/2015 | Bjoernskov | ............ | F03D 80/00 |
| | | | | 248/354.1 |
| 2018/0111750 A1* | 4/2018 | Klein | ....................... | F03D 13/40 |
| 2020/0378365 A1* | 12/2020 | Mathew | .................. | F03D 13/40 |
| 2021/0310464 A1* | 10/2021 | Winkes | ................... | F16B 7/042 |
| 2021/0340960 A1* | 11/2021 | Zareba | ...................... | B60P 3/40 |
| 2021/0355916 A1 | 11/2021 | Saez Anthonisen | | |
| 2022/0099065 A1* | 3/2022 | Stuart | ...................... | F03D 13/40 |
| 2022/0307479 A1* | 9/2022 | Antonsen | .............. | B63B 25/002 |

FOREIGN PATENT DOCUMENTS

| | | | |
|---|---|---|---|
| EP | 3574150 B1 | 10/2020 | |
| WO | WO 2012007318 A2 | 1/2012 | |
| WO | WO 2020035770 A1 | 2/2020 | |

\* cited by examiner

CONNECTION EQUIPMENT ADAPTER FOR A WIND TURBINE TOWER SECTION

CROSS-REFERENCE TO RELATED APPLICATIONS

This application claims priority to EP application Ser. No. 22/162,745.8, having a filing date of Mar. 17, 2022, the entire contents of which are hereby incorporated by reference.

FIELD OF TECHNOLOGY

The following relates to a supporting system for supporting a tower section of a wind turbine and a tower section supporting arrangement. Furthermore, the following relates to a method of supporting a tower section of a wind turbine.

BACKGROUND

A tower of a wind turbine is made of the plurality of tower sections. The tower sections are transported independent from each other to the wind turbine site. Conventional tower sections comprise at axial end faces a plurality connection holes. The connection holes extend along an axial direction of the tower sections and the wind turbine tower, respectively. The end faces of the tower sections are equipped for example with L-flanges or T-flanges through which the axial connection holes extend. Respective connecting bolts and screws are inserted in the connection holes of two adjacent tower sections in order to provide a fixation between the two adjacent tower sections.

The axial connection holes may be used to fix the tower sections during transportation by bolts to a Universal Tower Transport Equipment (UTTE). However, modern turbine sections may not comprise connection holes in the axial end faces so that a connection to a UTTE by respective connecting bolts may not be possible. Instead, the tower sections comprise tower holes that are formed in a shell section of the tower section instead of a front face of the tower section. Thus, two tower section comprise overlapping shell sections such that the respective tower holes in the shells overlap as well. Next, a specific wedge flange coupling system is inserted into the respective overlapping tower holes of the tower sections to be connected. The tower holes have large oval-shaped holes, into which a fastener can be inserted. Furthermore, two wedge shaped clamping jaws are inserted into the tower holes, wherein the clamping jaws can be pressed apart from each other by the fastener. Hence, the fastener clamps both tower sections together by means of the two clamping jaws, that can be pressed against sidewalls in the tower holes and thus creates a symmetrical prestressed connection.

SUMMARY

An aspect relates to a system for connecting wind turbine sections having tower holes in the shell to a tower transport equipment.

A supporting system for supporting a tower section of a wind turbine, a tower section supporting arrangement and a method of supporting a tower section of a wind turbine is described.

According to a first aspect of embodiments of the present invention, a supporting system for supporting a tower section of a wind turbine is presented. The supporting system comprises a connection plate comprising a tower connection portion and a support connection portion, wherein the support connection portion is configured for being coupled to a tower support device for supporting the tower section. The tower connection portion comprises a tower connection hole for being coupleable to a tower hole extending through a shell section of the tower section. The supporting system further comprises a clamping device being partially insertable in the tower connection hole of the tower connection portion and the tower hole for detachably clamping the connection plate to the tower section.

According to a further aspect of embodiments of the present invention, a tower section supporting arrangement is presented. The tower section supporting arrangement comprises a tower section comprising a tower hole extending through a shell section of the tower section. furthermore, the arrangement comprises a tower support device configured for supporting the tower section, and the above-described system. The support connection portion is coupled to the tower support device, wherein the clamping device is partially inserted in the tower connection hole of the tower connection portion and the tower hole for detachably clamping the connection plate to the tower section.

According to a further aspect of embodiments of the present invention, a method of supporting a tower section of a wind turbine is presented. According to the method a support connection portion of a connection plate is coupled to a tower support device. A tower connection portion of the connection plate is coupled with a tower connection hole to a tower hole extending through a shell section of the tower section. furthermore, according to the method, a clamping device is partially inserted in the tower connection hole of the tower connection portion and the tower hole for detachably clamping the connection plate to the tower section.

A tower section has a cylindrical shape. The tower section comprises a center axis defining an axial direction. Accordingly, perpendicular to the axial direction, a radial direction extends from the center point to the outer shell of the tower section. The circumferential direction is the direction in perpendicular to the radial direction and the axial direction. The tower section supported by the inventive supporting system comprises respective tower holes that are formed in a shell section of the tower section instead of a front face of the tower section. The shell section may comprise for example a welded circumferential flange welded to a lateral end of the skin of the shell. This means, that the tower holes extend along a radial direction through the shell section, i.e., the skin surface, the surface shell and/or the circumferential flange, of the tower section. Accordingly, for mounting the tower section to a support device, it is not necessary that the tower section comprises axially extending holes in a front face of the tower section.

A support device is a device that supports the tower section during transportation, lifting and storage. Therefore, the support device is configured to stabilize the tower section and/or to provide a coupling e.g., to a transportation device.

For example, the support device is a support flange being coupleable to a tower section handling device, in particular a transport vehicle or a support platform. The support flange may have standardized connections with a transport device and thereby forms a Universal Tower Transport Equipment (UTTE).

Furthermore, the support device is a tower stabilization beam extending between two opposite sections of the shell section) of the tower section. The tower stabilization beam thereby enforces the tower section during transportation, lifting and storage. For example, vibrations and other impacts during transportation may be formed the tower section such that there is a risk that during transportation the tower section is deformed in a rather elliptical shape. Therefore, the tower stabilization beam functions as an Anti Ovalization Equipment (AO).

Furthermore, the support device may also provide a coupling to respective standard lashing elements. The lashing elements are used to fix lashing strips to secure the tower section from roll and pitch motions during sea and land transport.

The connection plate has a platelike structure defining a tower connection portion, to which the tower section can be mounted, and a support connection portion, to which the support device can be mounted. The tower connection portion comprises a tower connection hole that can be matched or overlaid with the tower hole, when the tower connection portion is attached to a surface of the shell section of the tower section. In other words, if the tower connection portion arranged onto the shell section of the tower section, both, the tower hole and the connection with forms common through holes for the clamping device and specifically a clamping fastener (such as a screw or bolt) of the clamping device. In other words, the tower connection hole in the tower connection portion extends along a radial direction of the tower section, when the connection plate is arranged onto the shell section of the tower section.

The support connection portion does also comprise a through hole, through which a further clamping fastener (such as a screw or bolt) can be guided for fixing the support device to the support connection portion.

The connection plate may be formed monolithically of one piece. Alternatively, the tower connection portion and the support connection portion may be made of separate parts. Hence, the tower connection portion and the support connection portion may be e.g., welded together.

The clamping device comprises at least an element, such as the below described clamping fastener or the adapter element which is guidable at least through the tower hole and the tower connection hole. For example, the clamping device comprises respective plate washers that are arranged at opposed surfaces of the shell section of the tower section, wherein the tower connection portion of the connection plate and the shell section of the tower section is clamped between the plate washers. For example, fixing screw may be guided through the plate washers and may clamp the two plate washers together for providing the clamping fixation.

Specifically, the clamping device is configured for detachably mounting the connection plate to the tower section and the support device. Hence, by the supporting system according to embodiments of the present invention, a tower section of a wind turbine, which comprises radial directed tower holes in the shell section, can be detachably connected by the clamping device to a respective (temporary) support device. Hence, by the supporting system a handling and transportation of heavy tower sections is possible.

According to an exemplary embodiment, the clamping device comprises a plate washer arrangeable at a surface of the shell section of the turbine tower. The clamping device further comprises a clamping fastener (for example a threaded bolt or a screw) for clamping the plate washer to the tower connection portion of the connection plate and for thereby clamping the tower section between the plate washer and the tower connection portion. The clamping fastener may be guided through the tower hole, the tower connection hole and a hole in the plate washer. The hole in the plate washer may comprise a respective thread for providing a screw connection with the clamping fastener. Additionally or alternatively, a counter nut may be screwed at an end of the clamping fastener to provide the clamping connection.

According to further exemplary embodiment, the plate washer comprises a curved contact surface for contacting the tower section, wherein the curved contact surface is in particular adaptable to the curvature of the respective surface of the tower section.

According to further exemplary embodiment, wherein the connection portion of the connection plate comprises a curved contact surface for contacting the tower section, wherein the curved contact surface is in particular adaptable to the curvature of the respective surface of the tower section.

By adapting the contact surface of the plate washer and/or the connection portion of the connection plate, the larger and homogeneous contact surface the shell section of the tower section can be provided.

Additionally or alternatively, an intermediate contacting plate can be interposed between the shell section and the connection portion or the shell section and the plate washer. The connecting plate may comprise for example two opposing surfaces, the one surface may be adapted to the curvature of the shell section of the tower section and the other surface may be adapted to the (flat, non-curved) shape of the connection portion or the plate washer. The contacting plate may be made of a deformable and elastic material, such as bonded foam and/or hard rubber. The elastic material is compressed by the clamping device and adopts the tower section curvature shape. The intermediate contacting plate can be glued to the connection portion.

According to a further exemplary embodiment, the clamping device comprises an adapter element being adapted to the cross section of the tower hole of the tower section, wherein the adapter element is insertable in the tower hole. The adapter element comprises a through hole extending between the plate washer and the connection portion of the connection plate for inserting the clamping fastener. The adapter element may form a hollow or solid body which fills the inner volume of the tower hole. Hence, relative movements of the adapter element inside the tower hole and therefore also relative movements between the parts of the clamping device and the connection plate may be reduced and prevented. Therefore, a more robust coupling may be achieved.

According to further exemplary embodiment, the adapter element comprises at least two clamping elements for being clampable in the tower hole. The clamping elements are configured for being adjustable with respect to each other, such that the adapter element is adaptable to the cross section of the tower hole. For example, the clamping elements may be movable with respect to each other. The clamping elements may comprise respective clamping surfaces which may be pressed against the inner surfaces of the tower hole. For example, if the tower hole comprises a larger diameter, the two clamping elements may be spaced apart in order to press the respective clamping surfaces of the clamping elements to the surface of the through hole.

Between the clamping elements spindle (mandrel) may be arranged, wherein upon rotation of the spindle, the clamping element may move together or apart from each other.

Furthermore, the two clamping elements may be movably (e.g., slidably) coupled to a central carrier body of the adapter element. The surface of the central carrier body, to which 1 of the clamping elements is arranged, may have a wedge like (conical extending) surface. Upon sliding the clamping element along the wedge like surface, the distance to the other clamping element may be increased or decreased.

According to further exemplary embodiment, the adapter element comprises an elliptical cross section, i.e., a cross section corresponding to an elongated tower hole) for being inserted in a respective tower hole having a respective elliptical cross section. specifically, the above-described clamping element of the adapter element may be configured to be movable along a major axis of the elliptical cross section of the tower.

According to further exemplary embodiment, the tower connection portion and the support connection portion of the connection plate are arranged in one common plane. Hence, a supporting hole or through opening of the support device may have the same hole extension as the radial hole extension of the tower hole.

According to further exemplary embodiment, the connection plate has as an L-shape and the tower connection portion and the support connection portion are formed perpendicular to each other. Hence, a supporting hole or through opening of the support connection portion may have a hole extension perpendicular to the radial hole extension of the tower hole. Specifically, conventional transport devices, such as the Universal Tower Transport Equipment (UTTE), are designed for being coupled to tower sections, having axial tower holes. Hence, by the L-shaped connection plate and the respective 90-degree angle between the tower connection portion and the support connection portion, the modern tower sections having radial extending tower holes in the tower shell section can be coupled to the conventional transport devices, without modification of the conventional transport devices.

According to further exemplary embodiment, the support device comprises the through opening, wherein the clamping device comprises a further plate washer arrangeable at a surface of the support device. The clamping device further comprises a further clamping fastener (for example a threaded bolt or a screw) for clamping the further plate washer to the support connection portion of the connection plate and for thereby clamping the support device between the further plate washer and the support connection portion. The further clamping fastener may be guided through the support device coupling opening, a supporting hole or through opening in the support connection portion and a hole in the further plate washer. The hole in the further plate washer may comprise a respective thread for providing a screw connection with the clamping fastener. Additionally or alternatively, a counter nut may be screwed at an end of the further clamping fastener to provide the clamping connection.

According to further exemplary embodiment, the further plate washer comprises an elongated hole through which the further clamping fastener is guidable.

Embodiments of this invention serve as an adapter between a variety of different tower equipment and the complex wedge tower sections having along its circumferential direction a plurality of elongated through holes in the shell section of the tower section. Those wedge tower sections are coupled together by a Wedge Connection Equipment Adapter which provides a robust clamping connection between two tower sections. The supporting system of embodiments of the present invention uses the elongated tower holes in the shell section to attach the wedge tower sections to the current support devices such as the support flange (Universal Tower Transport Equipment frame), the Anti Ovalization equipment, Sea-fastening lashing points as well as the top Tower Brackets used for tower section lifting and tower section upending. By using the same support system across different support device equipment and thereby enabling the reuse conventional support devices, the complexity and costs are reduced.

BRIEF DESCRIPTION

Some of the embodiments will be described in detail, with reference to the following figures, wherein like designations denote like members, wherein.

DETAILED DESCRIPTION

Figure 1:
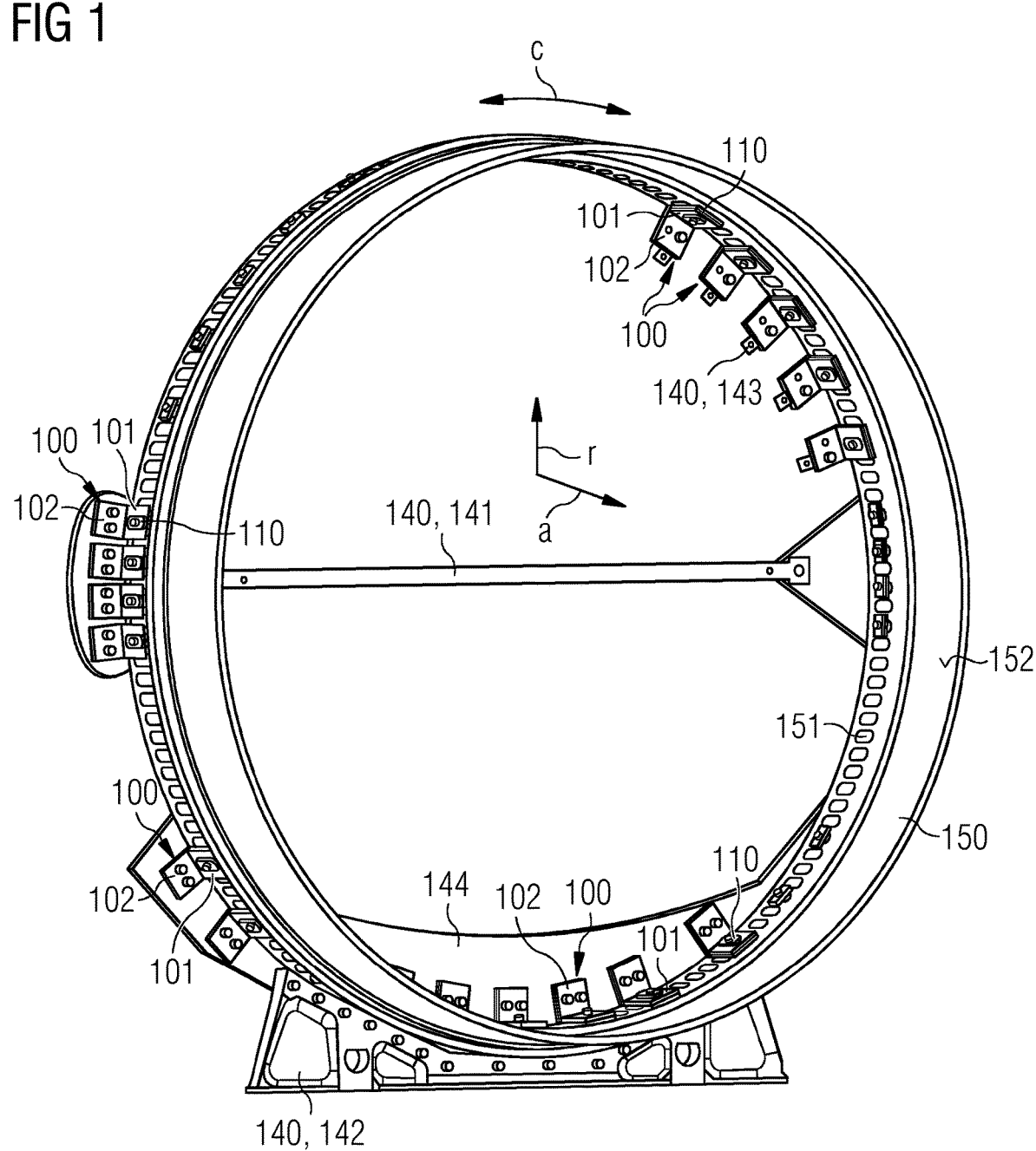
FIG. 1 shows a perspective view of a tower section being clamped to support devices by the supporting system according to an exemplary embodiment of the present invention.

The illustrations in the drawings are schematically. It is noted that in different figures, similar or identical elements are provided with the same reference signs.

FIG. 1 shows tower section supporting arrangement with a tower section 150 being clamped to support devices 140 by the supporting system according to an exemplary embodiment of the present invention.

The supporting system supports the tower section 150 of a wind turbine. The supporting system comprises a connection plate 100 comprising a tower connection portion 101 and a support connection portion 102, wherein the support connection portion 102 is configured for being coupled to the tower support device 140 for supporting the tower section 150. The tower connection portion 101 comprises a tower connection hole for being coupleable to a tower hole 151 extending through a shell section 152 of the tower section 150. The supporting system further comprises a clamping device 110 being partially insertable in the tower connection hole of the tower connection portion 101 and the tower hole 151 for detachably clamping the connection plate 100 to the tower section 150.

The tower section 150 has a cylindrical shape. The tower section 150 comprises a center axis defining an axial direction a. Accordingly, perpendicular to the axial direction a, a radial direction r extends from the center point to the outer shell section of the tower section. The circumferential direction c is the direction in perpendicular to the radial direction r and the axial direction a. The tower section supported by the inventive supporting system comprises respective tower holes 151 that are formed in the shell section 152 of the tower section 150 instead of a front face of the tower section. The shell section 152 comprises a welded circumferential flange 213 welded to a lateral end of the skin of the shell section 152. Hence, the tower holes 151 extend along the radial direction r through the shell section 152, i.e., the skin surface or surface shell, of the tower section 150.

A tower support device 140 is a device that supports the tower section 150 during transportation. Therefore, the tower support device 140 is configured to stabilize the tower section 150 and/or to provide a coupling to a transportation device.

As shown in FIG. 1, the support device is a support flange 142 being coupleable to a tower section handling device, in particular a transport vehicle or a support platform. The support flange 142 may have standardized connections with a transport device and thereby forms a Universal Tower Transport Equipment (UTTE). Furthermore, an interface plate 144 of the support flange 142 may provide a coupling area for the tower section 150 so that a plurality of connection plates 100 and clamping devices 110 of the supporting system can be used between the interface plate 144 and the tower section 150 to provide a stable support.

Furthermore, the support device 140 is a tower stabilization beam 141 extending between two opposite sections of the shell section 152 of the tower section 150. The tower stabilization beam 141 thereby enforces the tower section during transportation. The tower stabilization beam 141 functions as an Anti Ovalization Equipment (AO).

The inventive supporting system enables the tower stabilization beam 141 to be mounted to the connection plate 100, and thereby ensuring that no excessive ovalization happens on these otherwise very slender and ovalization prone tower sections 150 occur. For mounting the tower stabilization beam 141, the tower section 150 is lifted in the top to de-ovalize it, next, the adapter bolts (further clamping fasteners 211) are then installed in the identified support portion holes (this can be done by hand by a technician). Then the tower stabilization beam 141 is lifted into place horizontally, using a forklift or similar, the connection plates 100 and the tower stabilization beam 141 are then bolted together and the tower section 150 is release from lifting.

Furthermore, the support device 140 may also provide a coupling to respective standard lashing elements 143. The lashing elements 143 are used to fix lashing strips to secure the tower section 150 e.g., from roll and pitch motions during sea and land transport. For mounting, a technician will be lifted to the top of the tower section 150 to insert the clamping fastener 210 together with the connection plate 100. To the connection plate 100, the lashing elements 143 are already attached into the designated holes in the support connection portion 102. The lashing strips are then attached to their brackets and tightened up against anchors in the deck of the ship or in points of the vehicle.

Summarizing, a plurality of connection plates 100 and clamping devices 110 of the supporting system can be used to fix one of the support devices 140 and the tower section 150 to provide a stable support. For example, the tower connection portion 101 of the connection plates 100 can be arranged onto an inner surface of the shell section 152 (see for example the connection of the support flange 142 and the lashings 143) or onto an outer surface of the tower section 150 (see for example the connection of the tower stabilization beam 141).

Figure 2:
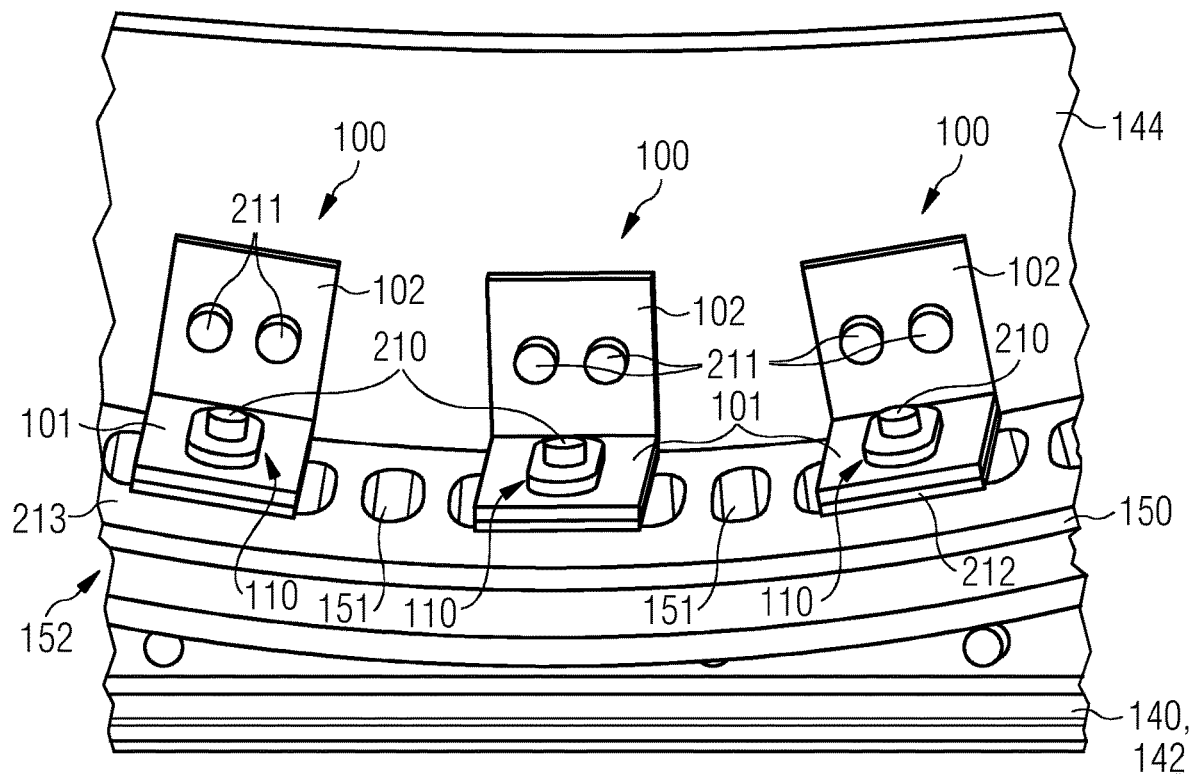
FIG. 2 shows a detailed view of a tower section being clamped to an interface plate of a support flange 142 according to an exemplary embodiment of the present invention.
Figure 3:
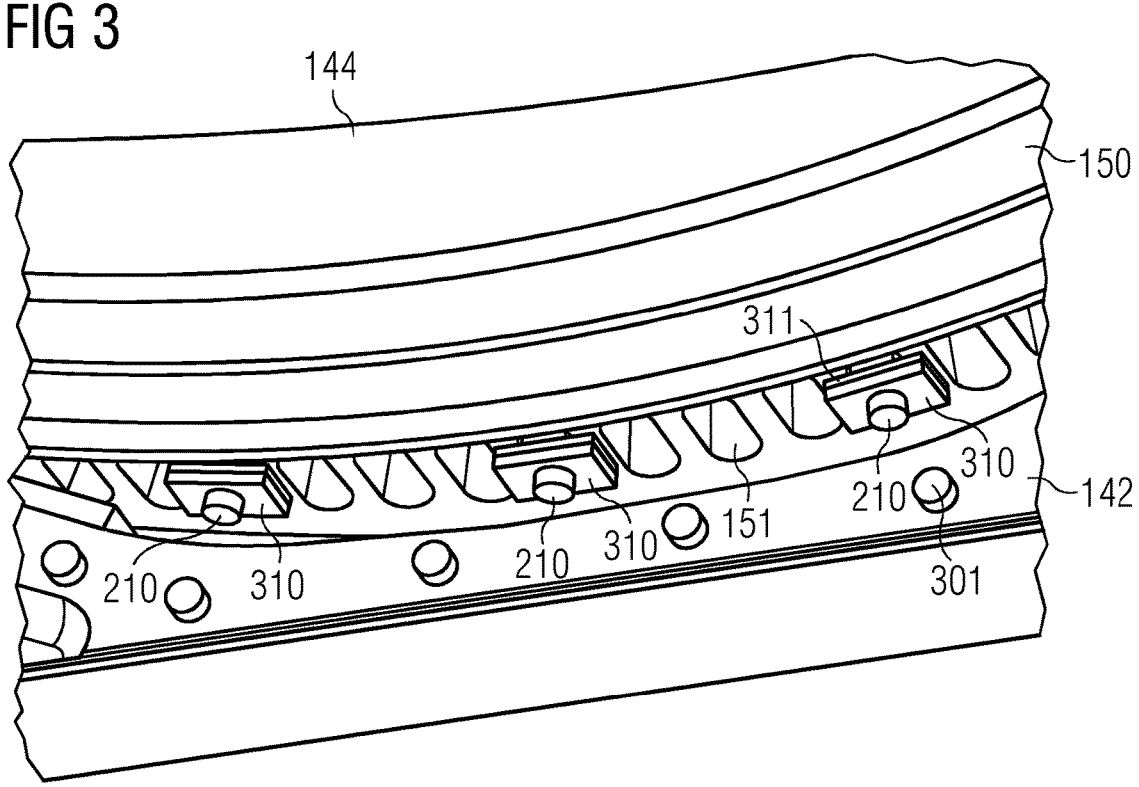
FIG. 3 shows a detailed view of a tower section being clamped to an interface plate of a support flange according to an exemplary embodiment of the present invention.

FIG. 2 and FIG. 3 shows a detailed view of a tower section 150 being clamped to an interface plate 144 of a support flange 142 according to an exemplary embodiment of the present invention. The interface plate 144 is fixed by screw 301 to a foot and the support flange 142, respectively. In a similar manner, the supporting system may also couple other support devices supporting the tower section 150.

The connection plate 100 has a platelike structure defining the tower connection portion 101, to which the tower section 150 can be mounted, and a support connection portion 102, to which the support device 140 can be mounted. The tower connection portion 101 comprises a tower connection hole that can be matched or overlaid with the tower hole 151, when the tower connection portion 101 is attached to a surface of the shell section 152 of the tower section 150. Hence, the tower connection hole in the tower connection portion 101 extends along a radial direction r of the tower section 150.

The support connection portion 102 does also comprise a through hole, through which a further clamping fastener 211 (such as a screw or bolt) can be guided for fixing the support device 140 to the support connection portion 102.

The clamping device 210 comprises at least one clamping fastener which is guidable at least through the tower hole 151 and the tower connection hole.

Specifically, the clamping device 110 is configured for detachably mounting the connection plate 100 to the tower section 150 and the support device 140. Hence, a tower section 150, which comprises radial directed tower holes 151 in the shell section 152, can be detachably connected by the clamping device to a respective (temporary) support device 140.

In the shown example, the clamping device 110 comprises a plate washer 310 arrangeable at a surface of the shell section 152 of the turbine tower 150. A clamping fastener 210 (for example a threaded bolt or a screw) can be screwed to the plate washer 310 and to the tower connection portion 101 of the connection plate 100 to thereby clamping the tower section 150 between the plate washer 310 and the tower connection portion 101. The clamping fastener 210 is guided through the tower hole 151, the tower connection hole and a hole in the plate washer 310. The hole in the plate washer 310 may comprise a respective thread for providing a screw connection with the clamping fastener 210.

Additionally, an intermediate contacting plate 212 can be interposed between the shell section 152 and the connection portion 101 or a further intermediate contacting plate 311 can be interposed between the shell section 152 and the plate washer 310. One surface of the contacting plates 212, 311 may be adapted to the curvature of the shell section 152 of the tower section 150. The contacting plates 212, 311 may be made of a deformable and elastic material, such as bonded foam and/or hard rubber. The elastic material is compressed by the clamping device 110 and adopts the tower section curvature shape. The contacting plates 212, 311 can be glued to the respective connection portions 101, 102 of the connection plate 100. The further contacting plate 311 may also be glued onto the plate washer 310.

The connection plate 100 has as an L-shape and the tower connection portion 101 and the support connection portion 102 are formed perpendicular to each other. Hence, a supporting hole or through opening of the support connection portion may have a hole extension perpendicular to the radial hole extension of the tower hole 151.

Figure 4:
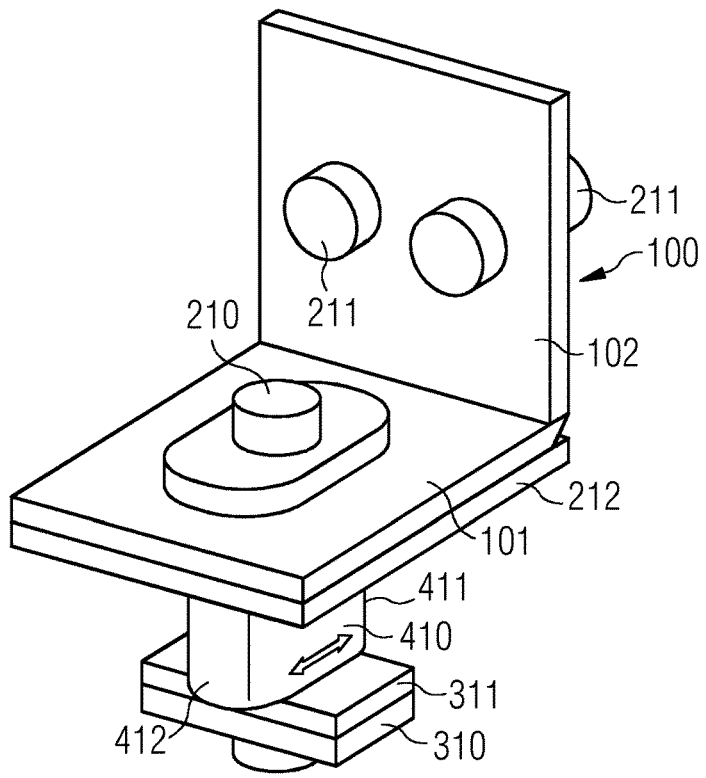
FIG. 4 shows a schematic view of an L-shaped connection plate according to an exemplary embodiment of the present invention.

FIG. 4 shows a schematic view of an L-shaped connection plate 100 according to an exemplary embodiment of the present invention. The clamping device 110 comprises an adapter element 410 being adapted to the (oval) cross section of the tower hole 151 of the tower section 150, wherein the adapter element 410 is insertable in the tower hole 151. The adapter element 410 comprises a through hole extending between the plate washer 310 and the tower connection portion 101 of the connection plate 100 for inserting the clamping fastener 210. The adapter element 410 is a solid body which fills the inner volume of the tower hole 151. Hence, relative movements of the adapter element 410 inside the tower hole 151 and therefore also relative movements between the parts of the clamping device 110 and the connection plate 100 are reduced.

The adapter element 410 comprises at least two clamping elements 411, 412 for being clampable in the tower hole 151. The clamping elements 411, 412 are configured for being adjustable with respect to each other, such that the adapter element 410 is adaptable to the cross section of the tower hole. For example, the clamping elements 411, 412 are movable with respect to each other. The clamping elements 411,412 comprise respective clamping surfaces which may be pressed against the inner surfaces of the tower hole 151.

Specifically, the tower holes 151 in the shell section 152 are formed in a long hole, i.e., elongated hole, design. The adapter element 410 comprises a respective cross section for being for being insertable in a respective tower hole 151 having a respective long hole shaped cross section. Specifically, the above-described clamping elements 411, 412 of the adapter element 410 are configured to be movable along a major axis of the elliptical or elongated hole cross section of the tower hole 151.

For example, in order to mount the support device, first the adapter elements 410 are inserted into the long hole shaped tower holes 151, and the back plate washers 310 are fastened. For example, in a next step the tower support device 140, such as the support flange 142 (UTTE) can then be mounted horizontally, like it would have been for an Lflange, and the remaining bolts, i.e., clamping fasteners 210, can be fastened on the top side of the adapter element 410. The tower section 150 can now be moved by lifting the support flange 142 with a tower mover.

Figure 5:
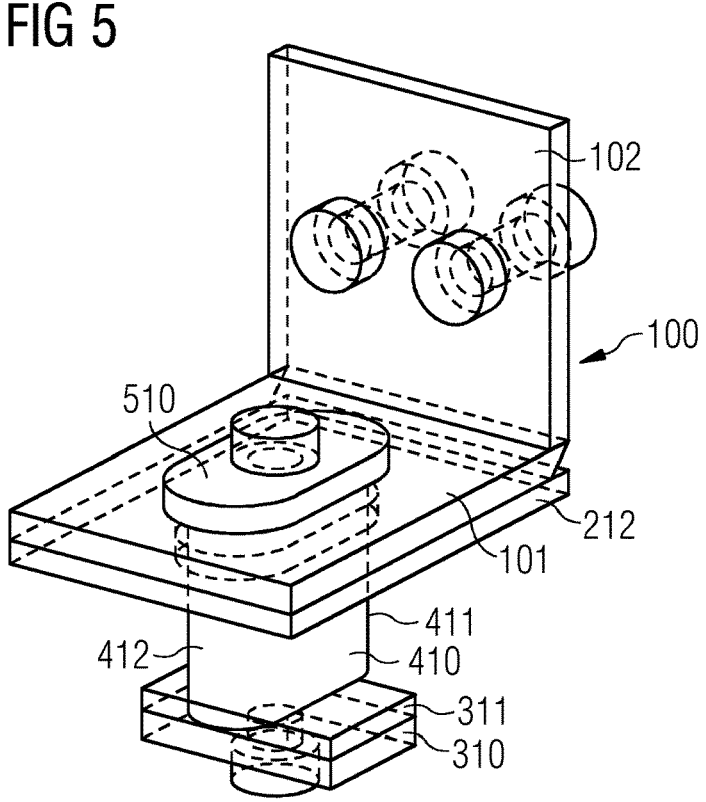
FIG. 5 shows a schematic view of an adapter element according to an exemplary embodiment of the present invention.

FIG. 5 shows a schematic view of an adapter element 410 according to an exemplary embodiment of the present invention. The adapter element 410 comprises a clamping rim 510 arranged at a top end and having a larger cross section than the main body part of the adapter element. Therefore, the clamping rim 510 has a larger cross section than the cross section of the tower hole 151, such that the clamping rim 510 firms an attachment surface by which the clamping rim 510 can be laid onto a surface of the tower connection portion 101 and the shell section 152, respectively. Hence, a further plate washer below the clamping fastener 210 is not necessary. The clamping rim 510 and the adapter element 410 may be monolithically formed of one piece. Alternatively, the clamping rim 510 and the adapter element 410 may be made of separate parts. Hence, the adapter element 410 and the clamping rim 510 may be e.g., welded together.

Figure 6:
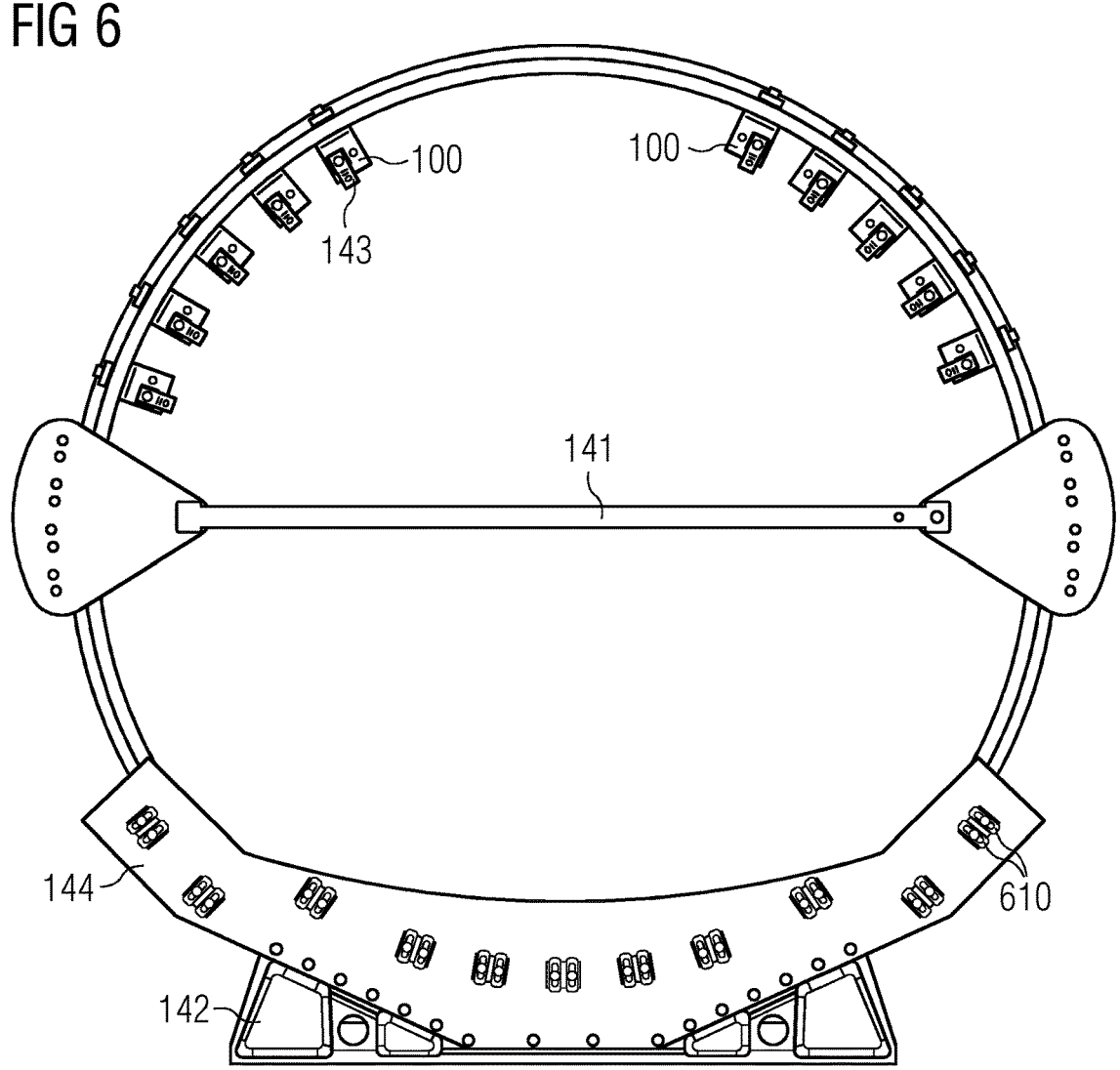
FIG. 6 shows a schematic view of a supporting system according to an exemplary embodiment of the present invention.

FIG. 6 shows a schematic view of a supporting system according to an exemplary embodiment of the present invention. Specifically, FIG. 6 shows a back view of the embodiment shown in FIG. 1.

A support flange 142 is shown which is coupled to a tower section handling device, in particular a transport vehicle or a support platform. The support flange 142 may have standardized connections with a transport device and thereby forms a Universal Tower Transport Equipment (UTTE). Furthermore, an interface plate 144 of the support flange 142 may provide a coupling area for the tower section 150 so that a plurality of connection plates 100 and clamping devices 110 of the supporting system can be used between the interface plate 144 and the tower section 150 to provide a stable support.

Furthermore, a tower stabilization beam 141 is shown extending between two opposite sections of the shell section 152 of the tower section 150. The tower stabilization beam 141 thereby enforces the tower section during transportation. The tower stabilization beam 141 functions as an Anti Ovalization Equipment (AO). For example, the connection plate and in particular the support connection portion 102 is mounted to an outer surface of the shell section 152 of the turbine tower 150.

Furthermore, a plurality of couplings to respective standard lashing elements 143 are shown. The lashing elements 143 are used to fix lashing strips for securing the tower section 150 e.g. from roll and pitch motions during sea and land transport.

Figure 7:
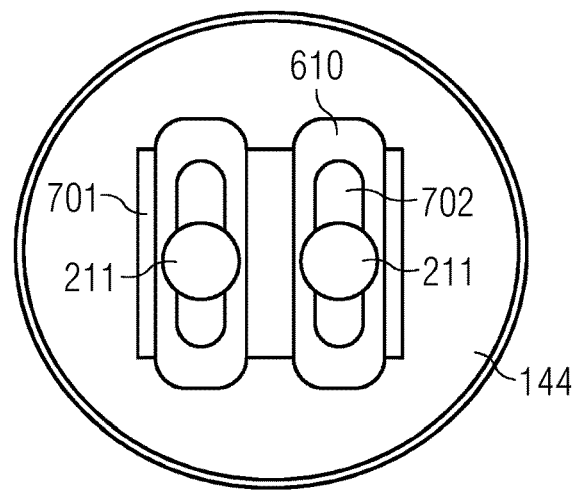
FIG. 7 shows a detailed view of a further plate washer having an elongated hole according to an exemplary embodiment of the present invention.

FIG. 7 shows a detailed view of the further plate washer 610 having an elongated hole 702 for fixing the interface plate 144 shown in FIG. 6.

The support device 140, in the example the interface plate 144 of the support flange 140 comprises a through opening 701, wherein the clamping device 110 comprises a further plate washer 610 arrangeable at a surface of the interface plate 144. The clamping device 110 further comprises a further clamping fastener 211 (for example a threaded bolt or a screw) for clamping the further plate washer 610 to the support connection portion 102 of the connection plate 100 and for thereby clamping the interface plate 144 between the further plate washer 701 and the support connection portion 102. The further clamping fastener 211 is guided through the coupling opening 701, a supporting hole or through opening in the support connection portion 102 and a hole in the further plate washer 610. The support connection portion 102 may comprise two through holes for fixing two further clamping fasteners 211. The respective coupling opening 701 is large enough for guiding the two further clamping fasteners 211 through it.

The hole in the further plate washer 610 comprises an elongated hole 702 through which the further clamping fastener 211 is guidable. Hence, the relative coupling positions may be adjusted such that a flexible fixation location can be provided.

Figure 8:
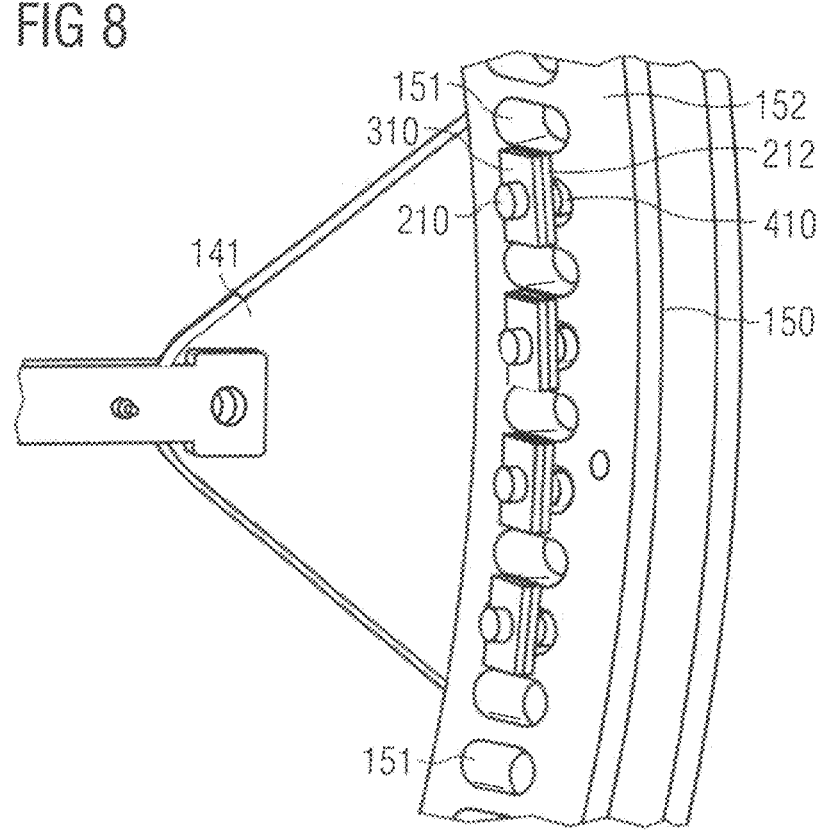
FIG. 8 shows a schematic view of a supporting system which couples a tower stabilization beam to the tower section according to an exemplary embodiment of the present invention.

FIG. 8 shows a schematic view of a supporting system which couples a tower stabilization beam 141 to the tower section 150 according to an exemplary embodiment of the present invention. As shown in detail in FIG. 8, a contacting plate 212 and the further plate washer 310 are arranged at the inner surface of the shell section 152 of the tower section 150. In the shown example, in each second elongated tower hole 151 of the shell section 152, a respective adapter element 410 of the clamping device 110 can be arranged. Hence, a robust removable connection between the tower section 150 and the tower stabilization beam 141 is provided.

Figure 9:
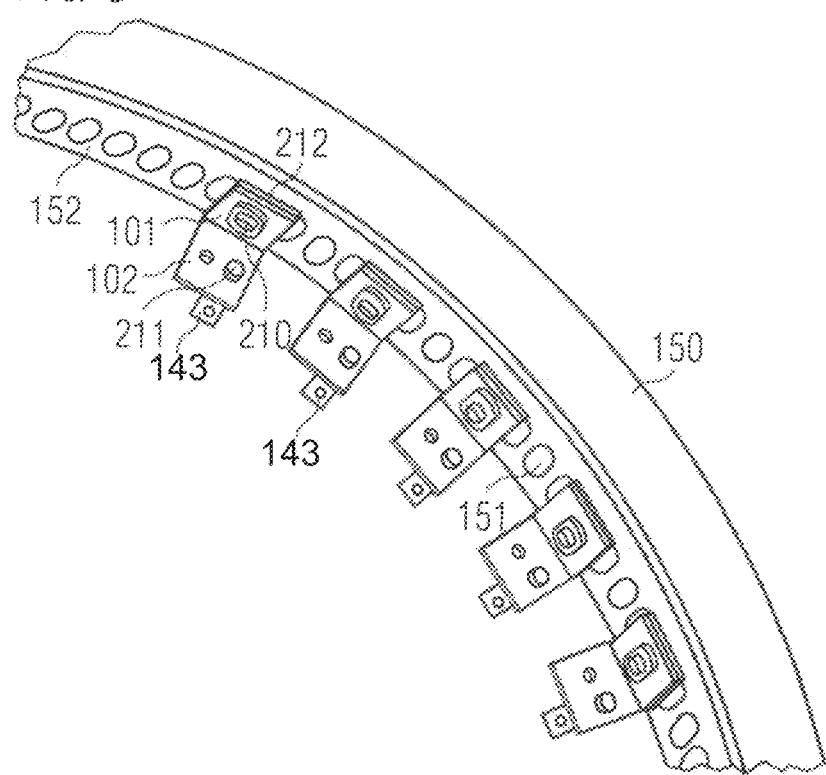
FIG. 9 shows a schematic view of a supporting system which couples a lashing to the tower section according to an exemplary embodiment of the present invention.

FIG. 9 shows a schematic view of a supporting system which couples lashing elements 143 to the tower section 150 according to an exemplary embodiment of the present invention. The lashing elements 143 are used to fix lashing strips to secure the tower section 150 from roll and pitch motions during sea and land transport.

The support device 140 couples respective lashing elements 143 for fixing standard lashing brackets with attached lashing strips. The lashing element 143 is a thin plate, e.g. made of metal material, comprising two through holes, wherein in one through hole the further clamping fastener 211 is coupled and the second though hole is used for fixing a lashing bracket of the bracket strips. One of the two through holes of the support connection platform may be unused or may be used for coupling a second lashing element 143.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A supporting system for supporting a tower section of a wind turbine,
the supporting system comprising
a connection plate comprising a tower connection portion and a support connection portion,
wherein the support connection portion is configured for being coupled to a tower support device for supporting the tower section having a cylindrical shape,
wherein the tower connection portion comprises a tower connection hole for being coupleable to a tower hole extending radially outward along a radial direction through a circumferential flange provided on a cylindrical shell section of the tower section,
a clamping device having at least one clamping fastener being partially insertable in and guidable through the tower connection hole of the tower connection portion and the tower hole for detachably clamping the connection plate to the tower section.

2. The supporting system according to claim 1,
wherein the clamping device comprises a plate washer arrangeable at a surface of the shell section of the turbine,
wherein the clamping device having the at least one clamping fastener for clamping the plate washer to the tower connection portion of the connection plate and for thereby clamping the tower section between the plate washer and the tower connection portion.

3. The supporting system according to claim 2,
wherein the plate washer comprises a curved contact surface for contacting the tower section,
wherein the curved contact surface is adaptable to the curvature of the respective surface of the tower section.

4. The supporting system according to claim 2,
wherein the connection portion of the connection plate comprises a curved contact surface for contacting the tower section,
wherein the curved contact surface is adaptable to the curvature of the respective surface of the tower section.

5. The supporting system according to claim 2,
wherein the clamping device comprises an adapter element being adapted to the cross section of the tower hole of the tower section,
wherein the adapter element is insertable in the tower hole,
wherein the adapter element comprises a through hole extending between the plate washer and the connection portion of the connection plate for inserting the at least one clamping fastener.

6. The supporting system according to claim 5,
wherein the adapter element comprises at least two clamping elements for being clampable in the tower hole,
wherein the clamping elements are configured for being adjustable with respect to each other, such that the adapter element is adaptable to the cross section of the tower hole.

7. The supporting system according to claim 5,
wherein the adapter element comprises an elliptical cross section for being inserted in a respective tower hole having a respective elliptical cross section.

8. The supporting system according to claim 1,
wherein the connection plate has as an L-shape and the tower connection portion and the support connection portion are formed perpendicular to each other.

9. The supporting system according to claim 1,
wherein the tower support device comprises a coupling opening,
wherein the clamping device comprises a further plate washer arrangeable at a surface of the support device,
wherein the clamping device further comprises a further clamping fastener for clamping the further plate washer to the support connection portion of the connection plate and for thereby clamping the support device between the further plate washer and the support connection portion.

10. The supporting system according to claim 9,
wherein the further plate washer comprises an elongated hole through which the further clamping fastener is guidable.

11. The supporting system according to claim 1,
wherein the support device is a tower stabilization beam extending between two opposite sections of the shell section of the tower section.

12. The supporting system according to claim 1,
wherein the support device is a support flange being coupleable to a tower section handling device.

13. The supporting system according to claim 12,
wherein the tower section handling device is a transport vehicle or a support platform.

14. A tower section supporting arrangement, comprising
a tower section comprising a tower hole extending through a shell section of the tower section,
a tower support device configured for supporting the tower section, and
the system according to claim 1,
wherein the support connection portion is coupled to the tower support device,
wherein the clamping device is partially inserted in the tower connection hole of the tower connection portion and the tower hole for detachably clamping the connection plate to the tower section.

15. A method of supporting a tower section of a wind turbine, the method comprising
coupling a support connection portion of a connection plate to a tower support device,
coupling a tower connection portion of the connection plate with a tower connection hole to a tower hole extending radially outward along a radial direction through a circumferential flange provided on a cylindrical shell section of the tower section having a cylindrical shape, and partially inserting and guiding a clamping device having at least one clamping fastener through and in the tower connection hole of the tower connection portion and the tower hole for detachably clamping the connection plate to the tower section.

\* \* \* \* \*